United States Patent
Chen et al.

(10) Patent No.: US 8,705,061 B2
(45) Date of Patent: Apr. 22, 2014

(54) MULTI-FUNCTION PRINTER WITH A BUILT-IN REALLY SIMPLE SYNDICATION (RSS) READER

(75) Inventors: Hsien-Chung Chen, New Taipei (TW); Tien-I Kao, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 192 days.

(21) Appl. No.: 13/325,070

(22) Filed: Dec. 14, 2011

(65) Prior Publication Data
US 2013/0107300 A1 May 2, 2013

(30) Foreign Application Priority Data
Oct. 28, 2011 (TW) .............................. 100139399 A

(51) Int. Cl.
| | | |
|---|---|---|
| G06F 15/00 | (2006.01) | |
| G06F 3/12 | (2006.01) | |
| G06K 1/00 | (2006.01) | |
| G06F 17/30 | (2006.01) | |
| H04N 1/00 | (2006.01) | |
| G06K 15/02 | (2006.01) | |

(52) U.S. Cl.
CPC ........ *G06F 17/3089* (2013.01); *H04N 1/00204* (2013.01); *G06K 15/02* (2013.01)
USPC .......................................... 358/1.13; 358/1.15

(58) Field of Classification Search
CPC . G06F 17/3089; H04N 1/00204; G06K 15/02
USPC ........................................ 358/1.13, 1.15, 448
See application file for complete search history.

(56) References Cited

U.S. PATENT DOCUMENTS

| | | |
|---|---|---|
| 2008/0104044 A1 | 5/2008 | Kardamilas et al. |
| 2010/0165379 A1* | 7/2010 | Ackerman et al. ........... 358/1.15 |
| 2012/0049998 A1* | 3/2012 | Lim et al. ....................... 340/1.1 |

FOREIGN PATENT DOCUMENTS

| | | |
|---|---|---|
| TW | I247690 | 1/2006 |
| TW | 200834358 | 8/2008 |
| TW | 200901021 | 1/2009 |

OTHER PUBLICATIONS

"Office Action of Taiwan Counterpart Application", issued on Febuary 18, 2014, p. 1-12, in which the listed references were cited.

* cited by examiner

*Primary Examiner* — Douglas Tran
(74) *Attorney, Agent, or Firm* — Jianq Chyun IP Office

(57) ABSTRACT

A multi-function printer (MFP) is provided, which includes a user interface, a storage unit, a network module and a control module. The user interface is served as an input interface and a display interface of the MFP. The storage unit stores address information and at least one really simple syndication (RSS) message of at least one subscription website on the Internet. The network module enables the MFP to have network connectivity. The control module is served as an operation core of the MFP, and has a built-in RSS reader. The control module is periodically connected to the subscription website through the network module according to the address information of the subscription website, and reads the at least one RSS message of the subscription website through the RSS reader for storing into the storage unit and further displaying the at least one stored RSS message on the user interface.

19 Claims, 2 Drawing Sheets

MULTI-FUNCTION PRINTER WITH A BUILT-IN REALLY SIMPLE SYNDICATION (RSS) READER

CROSS-REFERENCE TO RELATED APPLICATION

This application claims the priority benefit of Taiwan application serial no. 100139399, filed on Oct. 28, 2011. The entirety of the above-mentioned patent application is hereby incorporated by reference herein and made a part of this specification.

BACKGROUND OF THE INVENTION

1. Field of the Invention

The invention relates to a multi-function printer. Particularly, the invention relates to a multi-function printer with a built-in really simple syndication (RSS) reader.

2. Description of Related Art

With the advent of information society, office automation devices such as a scanner, a photocopy (copy) machine and a printer, etc. are generally set in an office, and a user can use these office automation devices to implement document processing tasks. It should be noticed that a lot of space is occupied when the aforementioned office automation devices are simultaneously equipped in the office. Therefore, a multi-function printer (MFP) integrated with a scan function, a photocopy (copy) function and a print function, etc. is developed. In order to improve usage convenience of the MFP, a fax function is also added to the MFP. Obviously, how to further increase the usage convenience of the MFP is an important issue to be developed by related practitioner.

SUMMARY OF THE INVENTION

The invention is directed to a multi-function printer (MFP) with a built-in really simple syndication (RSS) reader, which increases usage convenience of the MFP.

An embodiment of the invention provides a multi-function printer (MFP) including a user interface, a storage unit, a network module and a control module. The user interface is served as an input interface and a display interface of the MFP. The storage unit stores address information and at least one RSS message of at least one subscription website on the Internet. The network module enables the MFP to have network connectivity. The control module is served as an operation core of the MFP, and has a built-in RSS reader. The control module is periodically connected to the subscription website through the network module according to the address information of the subscription website, and reads the at least one RSS message of the subscription website through the RSS reader for storing into the storage unit and further displaying the at least one stored RSS message on the user interface.

In an embodiment of the invention, the MFP further includes a print module, which is coupled to and controlled by the control module, and performs a print task in response to a print request relating to the at least one RSS message.

Another embodiment of the invention provides an MFP having network connectivity, which includes a user interface and a control module. The user interface is served as an input interface and a display interface of the MFP. The control module is coupled to the user interface and is served as an operation core of the MFP. The control module has a built-in RSS reader, and is periodically connected to at least one subscription website according to address information of the at least one subscription website on the Internet, and reads at least one RSS message of the subscription website through the RSS reader for displaying on the user interface.

Another embodiment of the invention provides an MFP having network connectivity, which includes an RSS reader, a user interface and a control module. The user interface is served as an input interface and a display interface of the MFP. The control module is coupled to the RSS reader and the user interface, and is served as an operation core of the MFP. The control module is periodically connected to at least one subscription website according to address information of the at least one subscription website on the Internet, and reads at least one RSS message of the subscription website through the RSS reader for displaying on the user interface.

In an embodiment of the invention, the MFP having the network connectivity further includes a storage unit and a print module. The storage unit is coupled to and controlled by the control module, and stores the address information and the at least one RSS message of the subscription website. The print module is coupled to and controlled by the control module, and performs a print task in response to a print request relating to the at least one RSS message.

In an embodiment of the invention, the MFP or the MFP having the network connectivity further includes a scan module and a fax module. The scan module is coupled to and controlled by the control module, and performs a scan task in response to a scan request. The fax module is coupled to and controlled by the control module, and performs a fax task in response to a fax request.

In an embodiment of the invention, the control module stores the address information of the subscription website to the storage unit in response to an input setting of the user interface.

In an embodiment of the invention, the control module stores the address information of the subscription website to the storage unit in response to an input setting of a local computer.

Another embodiment of the invention provides an MFP having network connectivity, characterized in that the MFP has a built-in RSS reader, so that the MFP is capable of independently receiving, displaying and printing at least one RSS message of at least one subscription website on the Internet.

According to the above descriptions, the RSS reader is built in the MFP, so that the MFP simultaneously has a scan function, a photocopy (copy) function, a print function, a fax function, and a function of processing (for example, receiving, displaying and printing) the RSS messages of the subscription websites. In this way, the usage convenience of the MFP is further improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
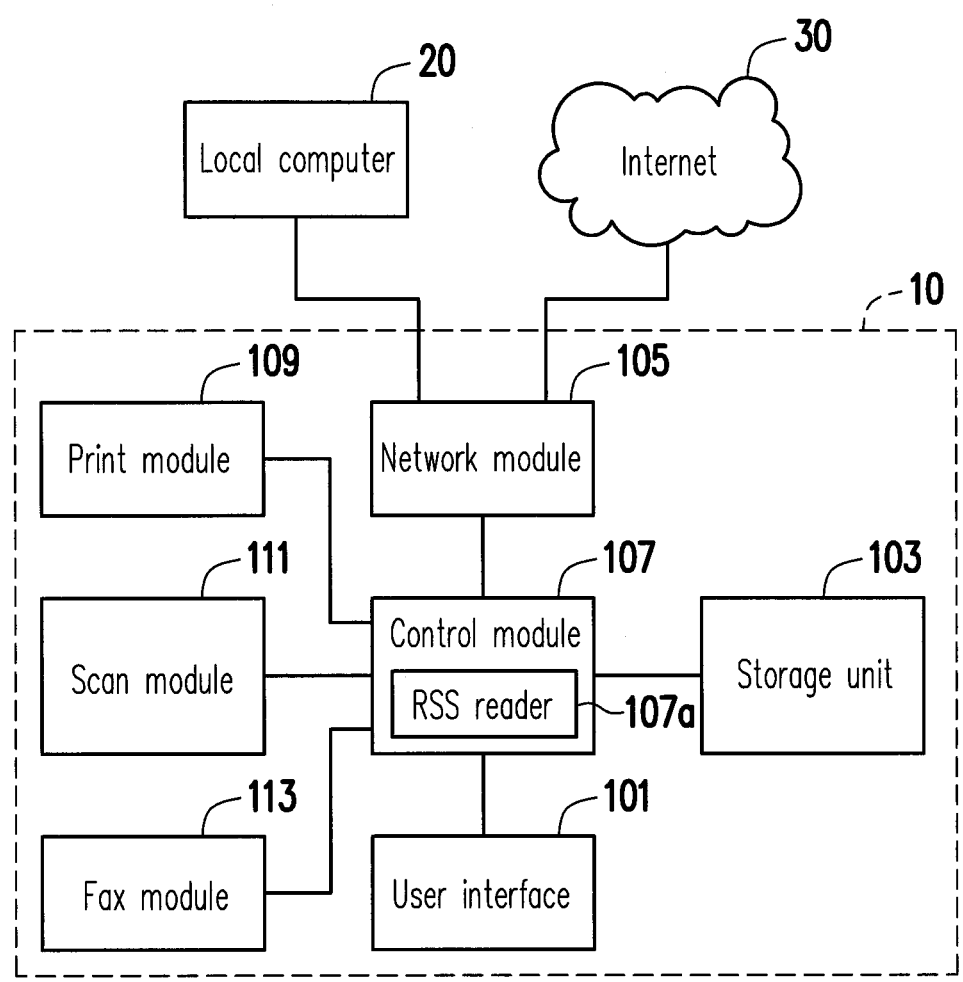
FIG. 1 is a schematic diagram of a multi-function printer (MFP) 10 according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a multi-function printer (MFP) 10 according to an embodiment of the invention. Referring to FIG. 1, the MFP 10 includes a user interface (UI) 101, a storage unit 103, a network module 105, a control module 107, a print module 109, a scan module 111 and a fax module 113. In the present embodiment, the MFP 10 may communicate with a local computer 20 in a local area network (LAN) through the network module 105. Moreover, the MFP 10 may also be connected to all websites on the Internet 30 through the network module 105. The network module 105 may be any type of a wired or wireless network module, so that the MFP 10 has network connectivity.

The UI 101 is served as an input interface and a display interface of the MFP 10. In the present embodiment, the UI 101 may be any type of a touch screen, for example, a resistive touch screen, a capacitive touch screen, an optical touch screen, an acoustic wave touch screen, an electromagnetic touch screen, etc., though the invention is not limited thereto.

The storage unit 103 stores address information (i.e. a web address) and really simple syndication (RSS) message(s) of at least one subscription website on the Internet 30. In other words, the storage unit 103 stores the address information and the RSS messages of one or more than one subscription websites. In the present embodiment, the storage unit 103 may be any type of a non-volatile memory, for example, a flash memory, an electrically erasable programmable read-only memory (EEPROM), a hard-disc drive (HDD), etc., though the invention is not limited thereto.

Moreover, the control module 107 configured to be served as an operation core of the MFP 10 stores the address information of a part of or all of (one or more than one of) the subscription websites into the storage unit 103 in response to an input setting of the UI 101. In other words, the user may input the address information of a part of or all of (one or more than one of) the subscription websites through the UI 101. In this way, the control module 107 may write the address information of a part of or all of (one or more than one of) the subscription websites into the storage unit 103.

Alternatively, the control module 107 may also store the address information of a part of or all of (one or more than one of) the subscription websites into the storage unit 103 in response to an input setting of the local computer 20. In other words, the user may transmit the address information of a part of or all of (one or more than one of) the subscription websites to the MFP 10 through the local computer 20. In this way, the control module 107 may write the address information of a part of or all of (one or more than one of) the subscription websites into the storage unit 103 through the network module 105.

The control module 107 is coupled to the UI 101, the storage unit 103, the network module 105, the print module 109, the scan module 111 and the fax module 113. In the present embodiment, besides serving as the operation core of the MFP 10, the control module 107 further has a built-in really simple syndication (RSS) reader 107a in a software form. In this case, the control module 107 is periodically connected to the subscription websites through the network module 105 according to the address information of the subscription websites stored in the storage unit 103, and reads the RSS messages of the subscription websites through the RSS reader for storing into the storage unit 103 and further displaying the stored RSS messages on the UI 101.

Obviously, the control module 107 periodically searches and records the RSS messages of all of the subscription websites stored in the storage unit 103 through the built-in RSS reader 107a, and displays the searched result on the UI 101 for the user to browse the recorded RSS messages, or for the user to click to directly connect/obtain a web content corresponding to the clicked subscription website. When the searched RSS messages have been updated, the control module 107 downloads the updated RSS messages through the network module 105, and displays the download result on the UI 101 to remind/notify the user with the new RSS messages or web contents.

On the other hand, the print module 109 is connected to and controlled by the control module 107, and performs a print task in response to a print request sent by the user that is relating to a part of or all of (one or more than one of) the RSS messages. In detail, the user may operate the UI 101 to select and print a part of or all of (one or more than one of) the RSS messages, or to select and print the web contents corresponding to a part of or all of (one or more than one of) the RSS messages. Therefore, without using a personal computer, the MFP 10 of the present embodiment can be independently operated to receive, display and print messages having an RSS format (which is complied with an XML format), or even directly connect/obtain the web contents (which is not necessarily complied to the XML format) corresponding to the subscription websites.

Moreover, in the present embodiment, the scan module 111 is coupled to and controlled by the control module 107, and performs a scan task in response to a scan request sent by the user. Moreover, the fax module 113 is coupled to and controlled by the control module 107, and performs a fax task in response to a fax request sent by the user. Certainly, in other selective embodiments of the invention, the print module 109, the scan module 111 and the fax module 113 can be optionally equipped in the MFP 10, which is determined according to an actual design/application requirement.

Figure 2:
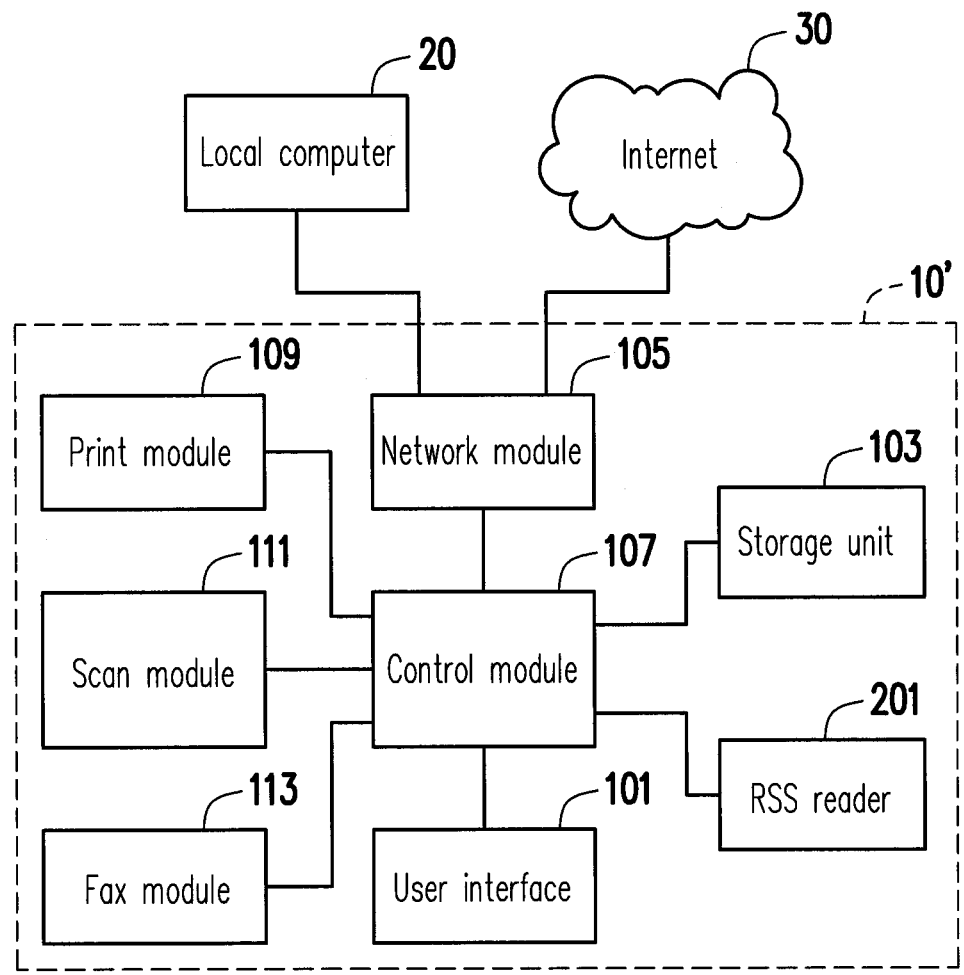
FIG. 2 is a schematic diagram of an MFP 10' according to another embodiment of the invention.

However, in the above embodiment, the RSS reader 107a built in the control module 107 is taken as an example for descriptions, though the invention is not limited thereto. In detail, FIG. 2 is a schematic diagram of an MFP 10' according to another embodiment of the invention. Referring to FIG. 1 and FIG. 2, a difference between the MFP 10' of FIG. 2 and the MFP 10 of FIG. 1 is that an RSS reader 201 is not built in the control module 107, but is independently disposed in the MFP 10'. For example, the software-form RSS reader 201 is stored in a non-volatile memory (for example, the storage unit 103 or another non-volatile memory) to facilitate the control module 107 to read and execute. In this way, the MFP 10' of FIG. 2 can achieve technical effects similar to that of the MFP 10 of FIG. 1, so that details thereof are not repeated.

Although possible technical means for implementing the invention have been provided by the aforementioned embodiments, according to the spirit of the invention, all technical means are considered to be within the scope of the invention as long as the RSS reader is built in the MFP having network connectivity, and the MFP is capable of independently receiving, displaying and printing the RSS messages of at least one subscription website on the Internet.

It should be noticed that in other embodiments of the invention, an identification module (not shown) can be additionally equipped in the MFP for identifying an identity (ID) of the user, and only the user with successful ID identification is allowed to browse the RSS messages of the subscription websites that are displayed on the UI, and is allowed to connect/obtain the web contents corresponding to the subscription websites. Otherwise, the user with failed ID identification is forbidden to browse the RSS messages of the subscription websites that are displayed on the UI, and is forbidden to connect/obtain the web contents corresponding to the subscription websites.

In summary, an RSS reader is built in the MFP, so that the MFP simultaneously has a scan function, a photocopy (copy) function, a print function, a fax function, and a function of processing (for example, receiving, displaying and printing) the RSS messages of the subscription websites. In this way, the usage convenience of the MFP is further improved.

In addition, in the other embodiment of the present invention, a wire/wireless router (not shown) can be built in the MFP 10/10', and can be coupled to the control module 107. The built-in wire/wireless router can be any type of wire/wireless router, for example, ADSL, 3G, cable, PLC, etc., and is configured to make the MFP 10/10' have a network print service function. The built-in wire/wireless router can further provide a network connection service due to the wire/wireless router has a property similar to an IP sharer, and therefore, all electronic devices with the network function located in the same domain can connect with an Internet 30. In this case, the print module 109 may be further configured to perform a print task in response to a print request transmitted from the built-in wire/wireless router.

Furthermore, in the other embodiment of the present invention, a wireless communication module (not shown) can be built-in the MFP 10/10', and can be coupled to and controlled by the control module 107. The built-in wireless communication module can be configured to wirelessly connect with a wireless handset (not shown), so as to make the MFP 10/10' have a wireless communication service function. In this case, the built-in wireless communication module may be a bluetooth communication module, such that the wireless handset may be a bluetooth handset, but not limited thereto. Obviously, the MFP 10/10' can implement the purpose of communicating without connecting with any local telephone due to the built-in wireless communication module, such that the purpose of wirelessly communicating can be achieved due to the user can freely move in communicating within the indoor space.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A multi-function printer, comprising:
    a user interface, configured to be served as an input interface and a display interface of the multi-function printer;
    a storage unit, configured to store address information and at least one really simple syndication message of at least one subscription website on an Internet;
    a network module, enabling the multi-function printer to have network connectivity; and
    a control module, coupled to the user interface, the storage unit and the network module, configured to be served as an operation core of the multi-function printer, and having a built-in really simple syndication reader,
    wherein the control module is periodically connected to the subscription website through the network module according to the address information, and the control module receives the at least one really simple syndication message of the subscription website through the network module and reads the at least one really simple syndication message of the subscription website through the really simple syndication reader for storing into the storage unit and further displaying the at least one stored really simple syndication message on the user interface.

2. The multi-function printer as claimed in claim 1, further comprising:
    a print module, coupled to and controlled by the control module, and configured to perform a print task in response to a print request relating to the at least one really simple syndication message.

3. The multi-function printer as claimed in claim 1, further comprising:
    a scan module, coupled to and controlled by the control module, and configured to perform a scan task in response to a scan request.

4. The multi-function printer as claimed in claim 1, further comprising:
    a fax module, coupled to and controlled by the control module, and configured to perform a fax task in response to a fax request.

5. The multi-function printer as claimed in claim 1, further comprising:
    a print module, coupled to and controlled by the control module, and configured to perform a print task in response to a print request relating to the at least one really simple syndication message;
    a scan module, coupled to and controlled by the control module, and configured to perform a scan task in response to a scan request; and
    a fax module, coupled to and controlled by the control module, and configured to perform a fax task in response to a fax request.

6. The multi-function printer as claimed in claim 1, wherein the control module stores the address information of the subscription website to the storage unit in response to an input setting of the user interface.

7. The multi-function printer as claimed in claim 1, wherein the control module stores the address information of the subscription website to the storage unit in response to an input setting of a local computer.

8. The multi-function printer as claimed in claim 1, wherein the user interface comprises a touch screen.

9. The multi-function printer as claimed in claim 1, wherein the storage unit comprises a non-volatile memory.

10. The multi-function printer as claimed in claim 1, wherein the network module is a wired or wireless network module.

11. A multi-function printer having network connectivity, comprising:
    a user interface, configured to be served as an input interface and a display interface of the multi-function printer;
    a network module, configured to enable the multi-function printer to have network connectivity; and
    a control module, coupled to the user interface, configured to be served as an operation core of the multi-function printer, and having a built-in really simple syndication reader,
    wherein the control module is periodically connected to at least one subscription website through the network module according to address information of the at least one subscription website on an Internet, and the control module receives at least one really simple syndication message of the subscription website through the network module, reads the at least one really simple syndication message of the subscription website through the really simple syndication reader for displaying on the user interface.

12. The multi-function printer having network connectivity as claimed in claim 11, further comprising:
   a storage unit, coupled to and controlled by the control module, and configured to store the address information and the at least one really simple syndication message of the subscription website; and
   a print module, coupled to and controlled by the control module, and configured to perform a print task in response to a print request relating to the at least one really simple syndication message.

13. The multi-function printer having network connectivity as claimed in claim 12, wherein the control module stores the address information of the subscription website to the storage unit in response to an input setting of the user interface.

14. The multi-function printer having network connectivity as claimed in claim 12, wherein the control module stores the address information of the subscription website to the storage unit in response to an input setting of a local computer.

15. A multi-function printer having network connectivity, comprising:
   a really simple syndication reader;
   a user interface, configured to be served as an input interface and a display interface of the multi-function printer;
   a network module, configured to enable the multi-function printer to have network connectivity; and
   a control module, coupled to the user interface and the really simple syndication reader, and configured to be served as an operation core of the multi-function printer, wherein the control module is periodically connected to at least one subscription website through the network module according to address information of the at least one subscription website on an Internet, and the control module receives at least one really simple syndication message of the subscription website through the network module, reads the at least one really simple syndication message of the subscription website through the really simple syndication reader for displaying on the user interface.

16. The multi-function printer having network connectivity as claimed in claim 15, further comprising:
   a storage unit, coupled to and controlled by the control module, and configured to store the address information and the at least one really simple syndication message of the subscription website; and
   a print module, coupled to and controlled by the control module, and configured to perform a print task in response to a print request relating to the at least one really simple syndication message.

17. The multi-function printer having network connectivity as claimed in claim 16, wherein the control module stores the address information of the subscription website to the storage unit in response to an input setting of the user interface.

18. The multi-function printer having network connectivity as claimed in claim 16, wherein the control module stores the address information of the subscription website to the storage unit in response to an input setting of a local computer.

19. A multi-function printer having network connectivity, comprising:
   a network module, configured to enable the multi-function printer to have network connectivity; and
   a built-in really simple syndication reader, configured to receive at least one really simple syndication message of at least one subscription website on an Internet through the network module, wherein the multi-function printer displays and prints the at least one really simple syndication message of the subscription website on the Internet.

\* \* \* \* \*